US010422957B2

(12) United States Patent
Mekis et al.

(10) Patent No.: US 10,422,957 B2
(45) Date of Patent: Sep. 24, 2019

(54) METHOD AND SYSTEM FOR A LOW-LOSS OPTICAL Y-JUNCTION POWER SPLITTER

(71) Applicant: Luxera, Inc., Carlsbad, CA (US)

(72) Inventors: Attila Mekis, Carlsbad, CA (US); Lieven Verslegers, La Jolla, CA (US)

(73) Assignee: Luxera, Inc., Carlsbad, CA (US)

( * ) Notice: Subject to any disclaimer, the term of this patent is extended or adjusted under 35 U.S.C. 154(b) by 0 days.

(21) Appl. No.: 14/679,155

(22) Filed: Apr. 6, 2015

(65) Prior Publication Data

US 2015/0286004 A1 Oct. 8, 2015

Related U.S. Application Data

(60) Provisional application No. 61/995,302, filed on Apr. 7, 2014.

(51) Int. Cl.
*G02B 6/28* (2006.01)
*G02B 6/125* (2006.01)
*G02B 6/12* (2006.01)
*G02B 6/293* (2006.01)

(52) U.S. Cl.
CPC ........... *G02B 6/2808* (2013.01); *G02B 6/125* (2013.01); *G02B 6/2813* (2013.01); *G02B 6/12007* (2013.01); *G02B 6/29352* (2013.01)

(58) Field of Classification Search
CPC .... G02B 6/2808; G02B 6/2813; G02B 6/125; G02B 6/12007; G02B 6/29352
See application file for complete search history.

(56) References Cited

U.S. PATENT DOCUMENTS

| 5,757,995 | A  | * | 5/1998  | Chen ...................... G02B 6/125  |
|           |    |   |         | 385/132                                 |
| 6,463,188 | B1 | * | 10/2002 | Takahashi ............. G02B 6/1228     |
|           |    |   |         | 385/132                                 |
| 6,934,447 | B2 | * | 8/2005  | Kim ....................... G02B 6/1228 |
|           |    |   |         | 385/43                                  |
| 7,343,070 | B2 | * | 3/2008  | Van Der Vliet ...... G02B 6/1228        |
|           |    |   |         | 385/28                                  |
| 7,664,353 | B2 | * | 2/2010  | Yamamoto ............. G02B 6/125       |
|           |    |   |         | 385/43                                  |
| 8,207,752 | B2 | * | 6/2012  | Raj ....................... H03K 19/177 |
|           |    |   |         | 326/10                                  |

(Continued)

*Primary Examiner* — Ryan A Lepisto
(74) *Attorney, Agent, or Firm* — McAndrews, Held & Malloy

(57) ABSTRACT

Methods and systems for a low-loss optical Y-Junction power splitter are disclosed and may include a semiconductor die having an optical Y-junction. The optical Y-junction may comprise an input waveguide, two or more output waveguides, a taper region and a step feature. The input waveguide and the taper region may include a smooth transition between the input waveguide and the taper region, and the step feature may be between the taper region and the output waveguides. The semiconductor die may receive an optical signal in the input waveguide, and communicate substantially equal power optical signals to the output waveguides. The semiconductor die may comprise a photonically-enabled silicon CMOS integrated circuit. An optical signal may be received in each of the output waveguides and a summed output signal may be communicated to the input waveguide. The step feature may extend in a direction perpendicular to an axis of the output waveguides.

14 Claims, 8 Drawing Sheets

(56) References Cited

U.S. PATENT DOCUMENTS

| | | | | |
|---|---|---|---|---|
| 2003/0133663 A1* | 7/2003 | Orignac | ............... | G02B 6/125 |
| | | | | 385/45 |
| 2011/0158278 A1* | 6/2011 | Koch | ................. | G02B 6/4204 |
| | | | | 372/45.012 |
| 2013/0005606 A1* | 1/2013 | Chakravarty | ........ | G01N 21/253 |
| | | | | 506/9 |
| 2013/0028557 A1* | 1/2013 | Lee | ...................... | G02B 6/105 |
| | | | | 385/28 |

* cited by examiner

METHOD AND SYSTEM FOR A LOW-LOSS OPTICAL Y-JUNCTION POWER SPLITTER

CROSS-REFERENCE TO RELATED APPLICATIONS/INCORPORATION BY REFERENCE

This application claims priority to and the benefit of U.S. Provisional Application 61/995,302 filed on Apr. 7, 2014, which is hereby incorporated herein by reference in its entirety.

FIELD

Certain embodiments of the disclosure relate to semiconductor photonics. More specifically, certain embodiments of the disclosure relate to a method and system for a low-loss optical Y-Junction power splitter.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a low-loss optical Y-Junction power splitter, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a low-loss optical Y-Junction power splitter. Exemplary aspects of the disclosure may comprise in a semiconductor die with an optical Y-junction, where the optical Y-junction comprises an input waveguide, two or more output waveguides, a taper region and a step feature. The input waveguide and the taper region may include a smooth transition between them, and the step feature may be between the taper region and the two or more output waveguides. The semiconductor die may receive an optical signal in the input waveguide, and communicate substantially equal power optical signals to each of the two or more output waveguides. The semiconductor die may comprise a photonically-enabled integrated circuit. The semiconductor die may comprise silicon. An optical signal may be received in each of the two or more output waveguides and a summed output signal may be communicated to the input waveguide. The semiconductor die may comprise a complementary-metal oxide semiconductor (CMOS) photonics die. The step feature may extend in a direction perpendicular to an axis of the two or more output waveguides. The optical Y-junction may be part of a Mach-Zehnder interferometer. Widths of the two or more output waveguides may be equal or may be different and define a splitting ratio of the Y-junction. An insertion loss of the Y-junction may be less than 0.2 dB.

Figure 1A:
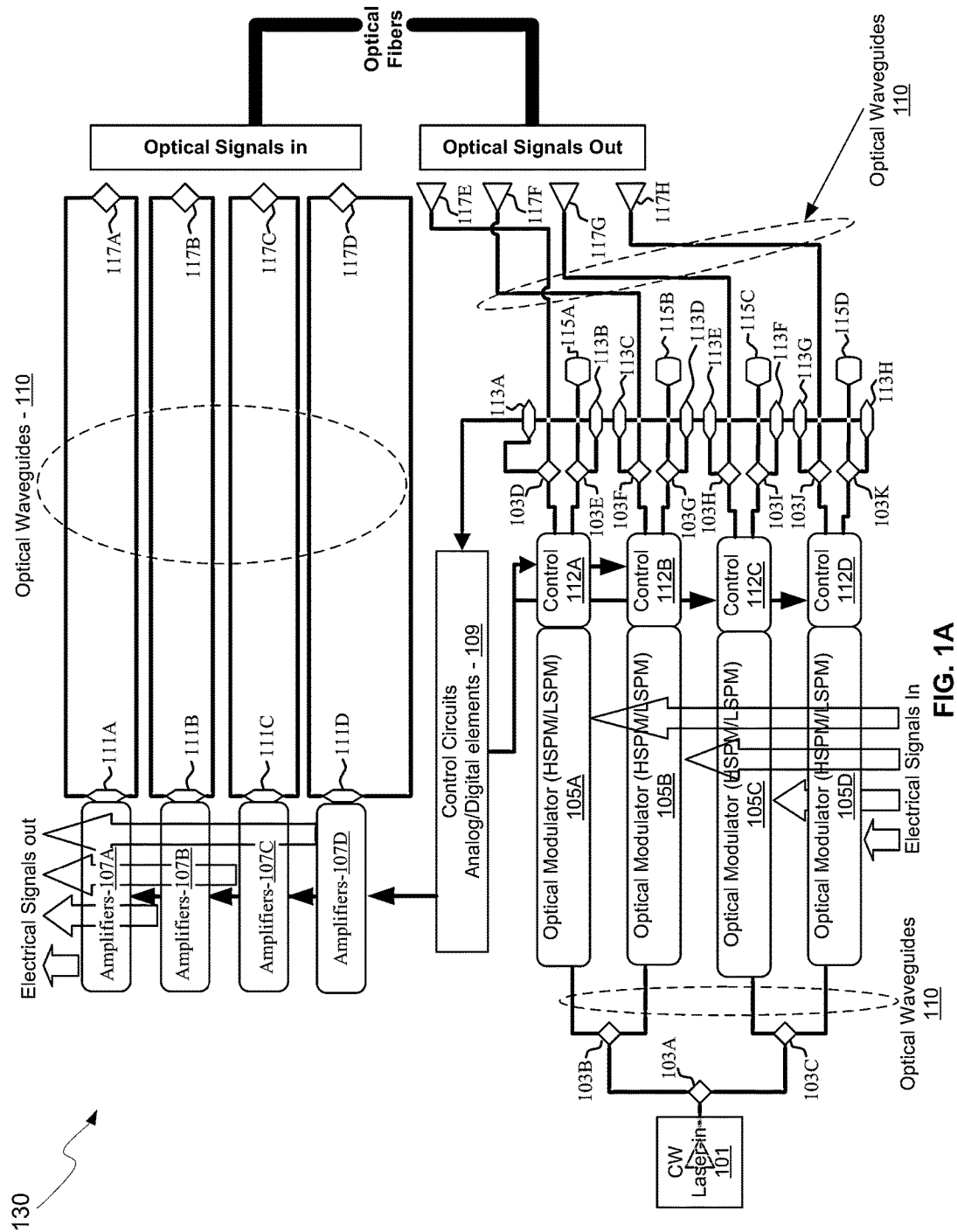
FIG. 1A is a block diagram of a photonically-enabled integrated circuit with low-loss optical Y-junction power splitters, in accordance with an example embodiment of the disclosure.

FIG. 1A is a block diagram of a photonically-enabled integrated circuit with low-loss optical Y-junction power splitters, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators within for directing one or more CW optical signals to the coupler 103A.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter, may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
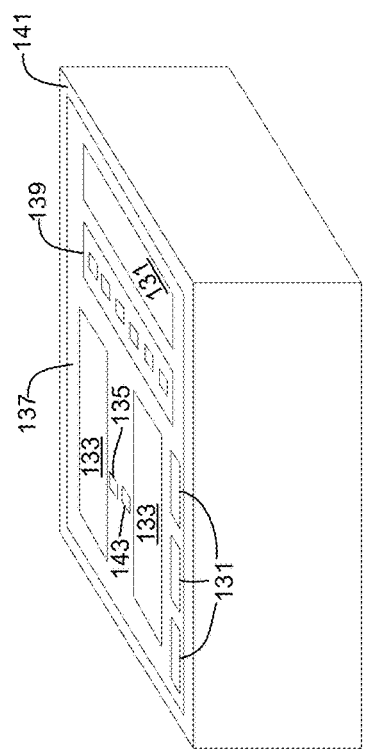
FIG. 1B is a diagram illustrating an exemplary photonically-enabled integrated circuit, in accordance with an exemplary embodiment of the disclosure.

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

The splitting and combining of optical signals may be accomplished with 1-by-2 splitters comprising Y-junctions and/or multi-mode interference (MMI) couplers, which are described further with respect to FIGS. 2-5. Insertion loss is an important parameter in splitters/combiners, especially where multiple splitters are utilized to generate a plurality of signals, because excessive insertion loss could cause the plurality of signals to have poor signal strength. Insertion loss may be reduced by configuring the optical modes in the input waveguide(s) to match with the optical modes in the output waveguide(s) when travelling through the junction.

FIG. 1B is a diagram illustrating an exemplary photonically-enabled integrated circuit, in accordance with an exemplary embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, a CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

In an example scenario, the couplers 103A-103K may comprise Y-junctions with low insertions loss, where the optical modes in the input and output waveguides match.

Figure 1C:
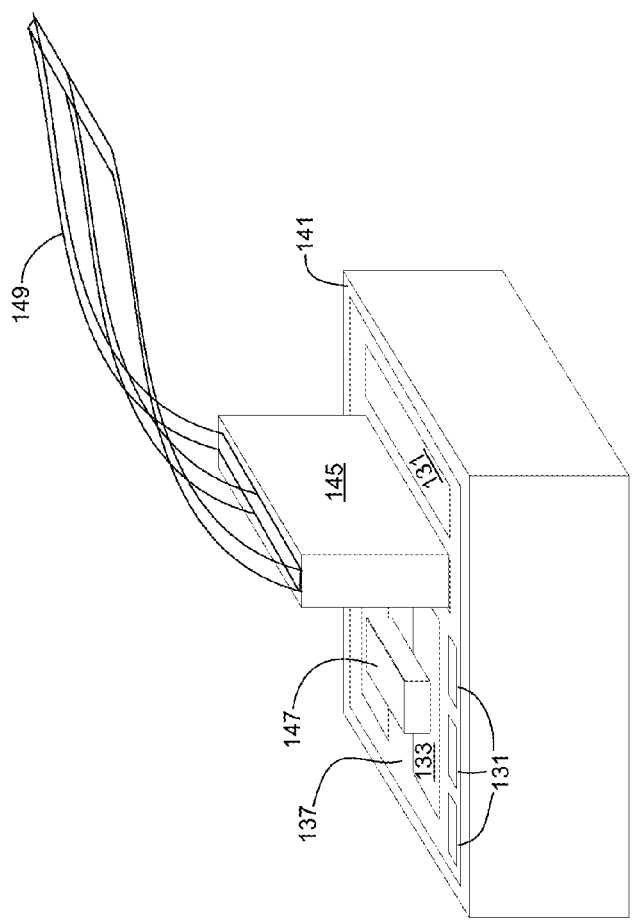
FIG. 1C is a diagram illustrating a photonically-enabled integrated circuit coupled to an optical fiber cable, in accordance with an example embodiment of the disclosure.
Figure 1C:
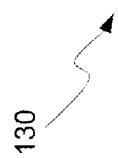

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprising the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2:
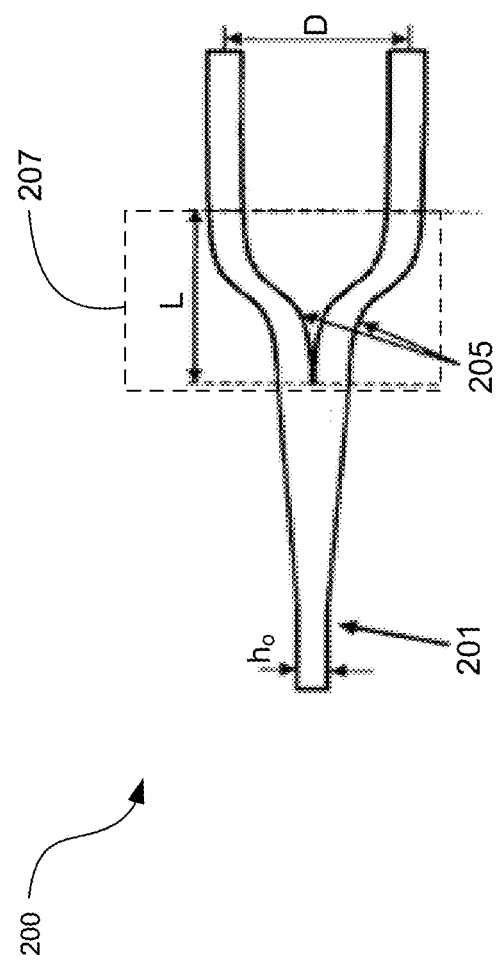
FIG. 2 illustrates a Y-junction, in accordance with an example embodiment of the disclosure.

FIG. 2 illustrates a Y-junction, in accordance with an example embodiment of the disclosure. Referring to FIG. 2, there is shown a Y-junction 200 comprising input waveguides 201, output waveguides 205, and a transition region 207. Various dimensions of the Y-junction 200 are shown, such as $h_0$, the width of the input waveguide prior to the taper, L, the length of the transition region 207 comprising a portion of the output waveguides 205, and D, the distance between the output waveguides 205.

While the waveguide 201 is described as an input waveguide and waveguides 205 are described as output waveguides, this is merely an example of a splitter for optical signals traveling from left to right in the figure. Accordingly, for optical signals traveling from right to left in the figure, the waveguides 205 would be input waveguides and the waveguide 201 would be the output waveguide.

The distance D and the "notch" between the output waveguides 205 may be factors in the insertion loss of the Y-junction 200, as these may configure the optical mode alignment with the output waveguides 205, as shown further with respect to FIG. 4.

Figure 3:
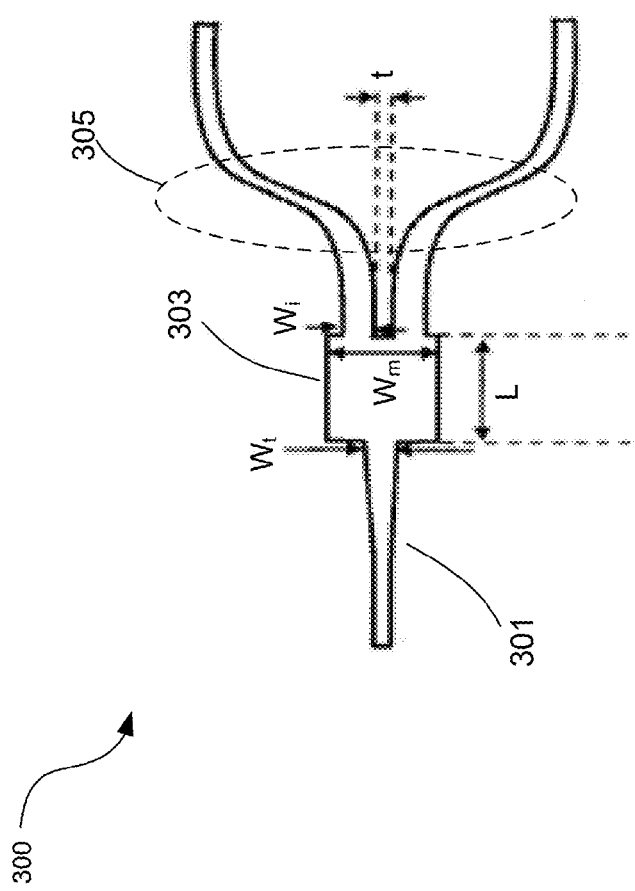
FIG. 3 illustrates a multi-mode interference coupler, in accordance with an example embodiment of the disclosure.

FIG. 3 illustrates a multi-mode interference coupler, in accordance with an example embodiment of the disclosure. Referring to FIG. 3, there is shown an MMI coupler 300 comprising input waveguide 301, an MMI section 303, and output waveguides 305. There is also shown a width L of the MMI section 303, width $W_i$ of the output waveguides 305, a gap width t between the output waveguides 305, and a width $W_t$ of the taper portion of the input waveguide 301.

The 1-by-2 MMI splitter 300 uses a non-adiabatic mode conversion method where the fundamental mode of the input waveguide 301 may be imaged in the MMI section 303 onto the two output waveguides 305.

The MMI splitter 300 comprises two discontinuities in the structure, one between the taper region of the input waveguide 301 and the MMI section 303, and the other between the MMI section 303 and the output waveguides 305. The width $W_m$ and the length L of the MMI section 303 configure the optical modes to coincide largely with the output waveguides 305.

Figures 4A, 4B:
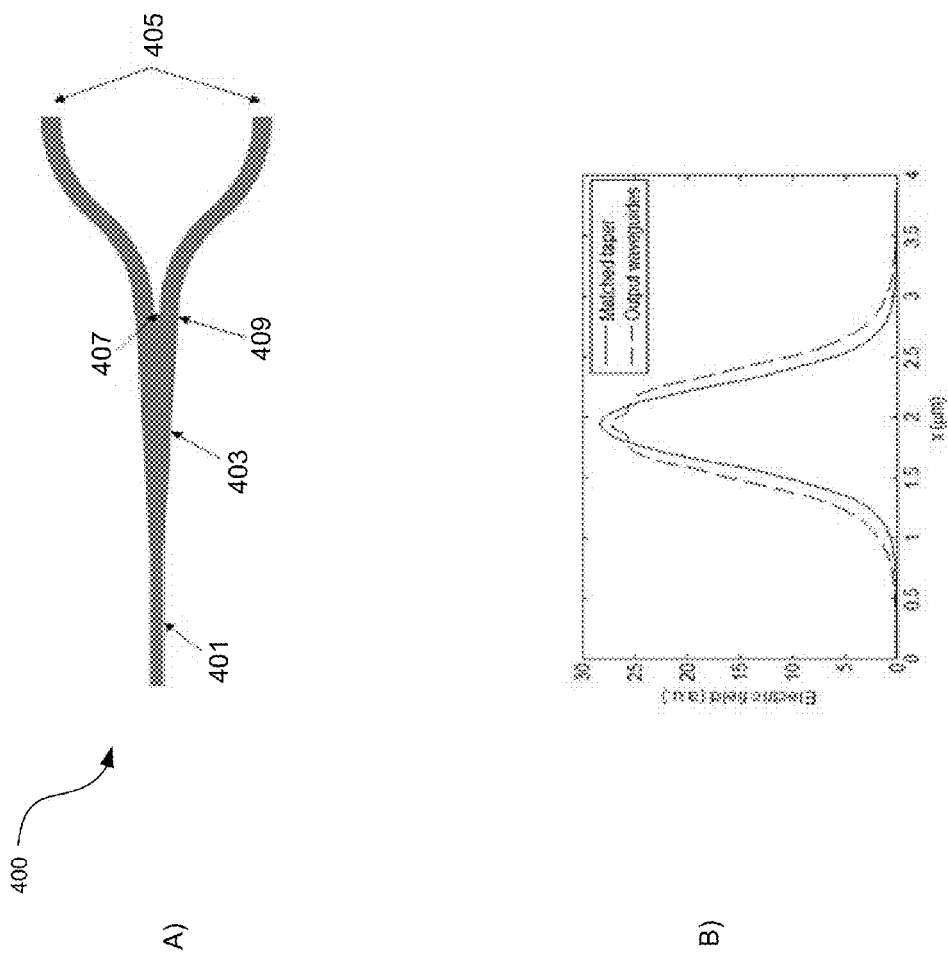
FIGS. 4A and 4B illustrate a Y-junction and a plot of modal overlap, in accordance with an example embodiment of the disclosure.

FIGS. 4A and 4B illustrate a Y-junction and a plot of modal overlap, in accordance with an example embodiment of the disclosure. Referring to FIG. 4A, there is shown a Y-junction 400 comprising an input waveguide 401, a taper section 403, output waveguides 405, and a notch 407. The transition 409 between the taper section 403 and the output waveguides 405 is a smooth, continuous transition, in that there are no steps in the sidewalls of the waveguides.

In the Y-junction, the adiabatic taper section 403 causes the intensity profile of the fundamental guided mode to spread out laterally and allows matching it, albeit imperfectly, to the intensity profile of the fundamental mode of the output waveguide pair 405. In the Y-junction, the transition between the wide end of the taper section 403 and the output waveguides 405 is smooth, that is, the width of the wide end of the taper section 403 is identical to the total width of the output waveguide pair 405.

The loss of the Y-junction 400 is limited by the size of the notch 407 between the output waveguides 405. The reason for this is the imperfect mode matching between the mode at the wide end of the taper section 403 and the two output waveguides 405.

FIG. 4B illustrates the electric field amplitudes of the fundamental modes in the taper section 403 and in the output waveguides 405. Because there is less high index material in the waveguide pair 405 than in the taper section 403, by virtue of the presence of the notch 407, the mode is more confined in the taper section 403 than in the output waveguides 405. Therefore the width of the mode in the taper section 403 is consistently narrower than in the output waveguides 405, which implies that the mismatch in the modal amplitudes is an intrinsic limitation of this architecture.

In addition, the insertion loss of the Y-junction 400 may be largely dependent on the size of the notch 407: the larger the notch, the higher the loss. Since the notch cannot be made arbitrarily small, the insertion loss will be limited by how small the notch size can be fabricated, which is the minimum critical dimension of the lithography process.

Figures 5A, 5B:
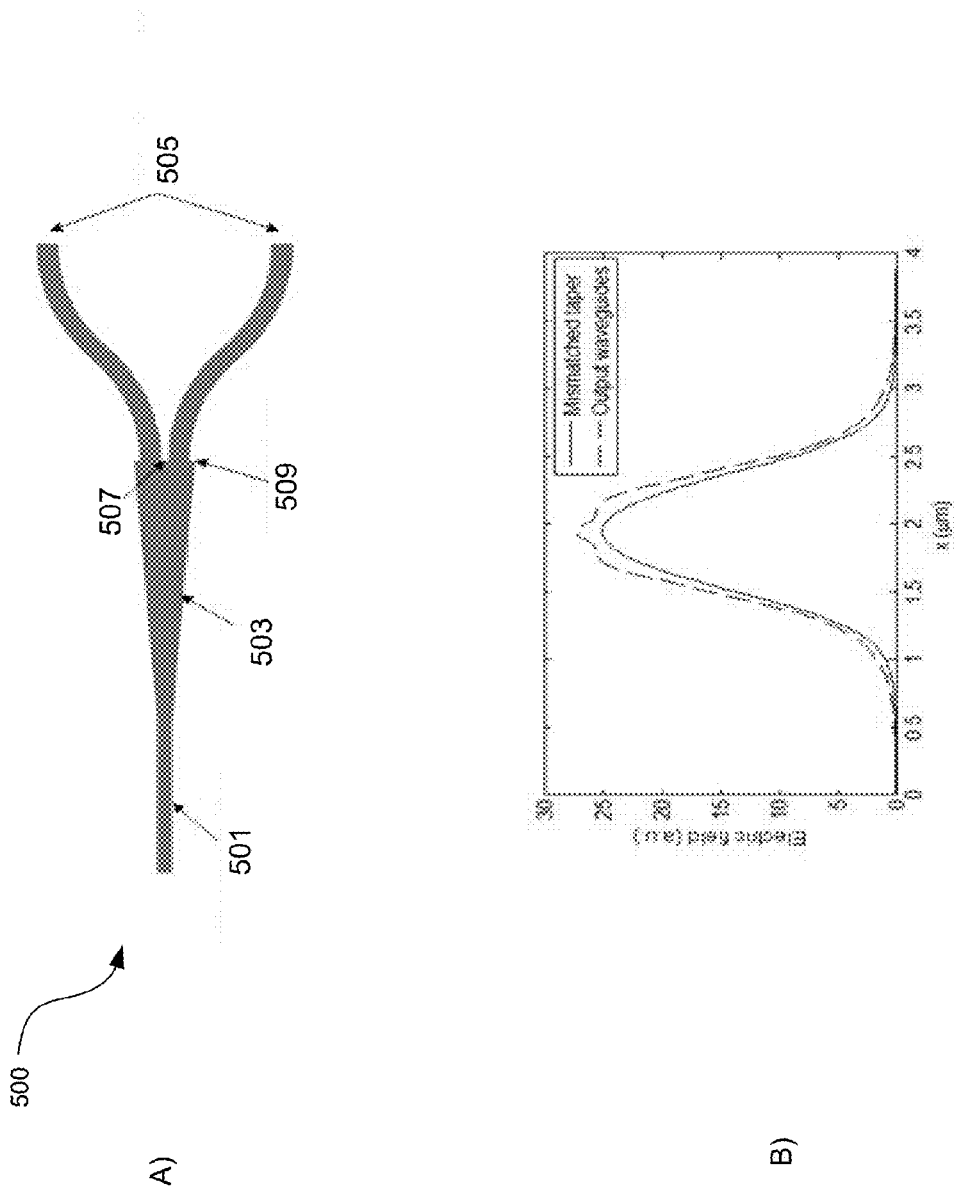
FIGS. 5A and 5B illustrate a low-loss Y-junction and a plot of modal overlap, in accordance with an example embodiment of the disclosure.

FIGS. 5A and 5B illustrate a low-loss Y-junction and a plot of modal overlap, in accordance with an example embodiment of the disclosure. Referring to FIG. 5A, there is shown a low-loss mismatched Y-junction 500 comprising an input waveguide 501, a taper section 503, output waveguides 505, a notch 507, and a step feature 509. The Y-junction 500 comprises a smooth transition, i.e., no step feature or discontinuity, between the input waveguide 501 and the taper section 503. The step feature 509 between the taper section 503 and the output waveguides 505 comprises a step in the sidewall of the waveguides such that the width of the taper section 503 is wider than the width of the output waveguides 505.

The step feature 509 improves the modal overlap between the taper section 503 and the output waveguides 505, with an increase in the width of the wide end of the taper section 503 without changing the total width of the output waveguide pair 505. This results in the step feature 509 that substantially aligns with the notch 507. Thus, the taper section 503 extends laterally beyond the sides of the output waveguides 505 perpendicular to the output waveguides 505 at the intersection with the taper section 503.

While the output waveguides in FIG. 5A are shown with equal widths, the each of the output waveguides may have different widths based on a desired splitting ratio, for example.

FIG. 5B illustrates the mode profiles for the taper section 503 and the output waveguides 505 with the step feature 509. The width of the mode in the taper section 503 is increased and is thus better matched to the mode of the output waveguide pair 505. Therefore, the addition of the step feature 509 removes the intrinsic limitation of the standard design.

Figures 6A, 6B:
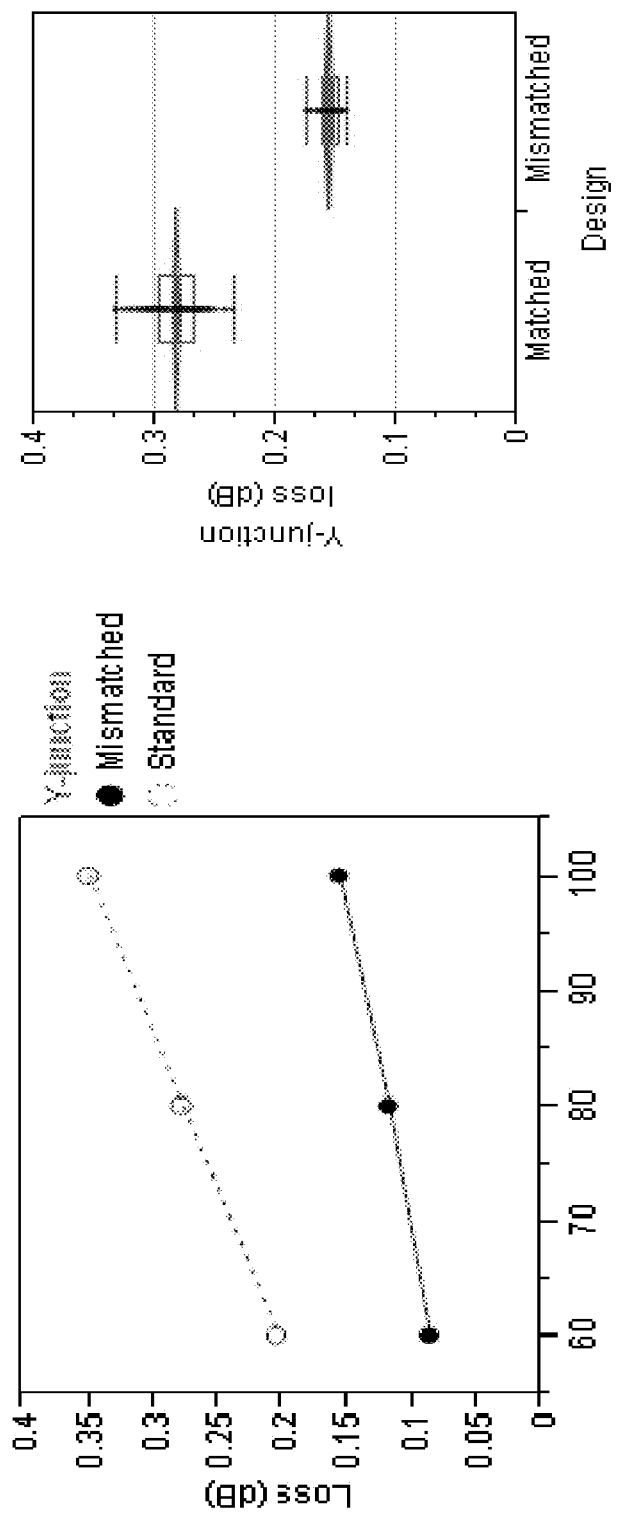
FIGS. 6A and 6B illustrate modeled and measured Y-junction insertion loss, in accordance with an example embodiment of the disclosure.

FIGS. 6A and 6B illustrate modeled and measured Y-junction insertion loss, in accordance with an example embodiment of the disclosure. Referring to FIG. 6A, there is shown a plot of insertion loss versus notch width of a standard Y-junction (filled-in circles) and a mismatched Y-junction. The mismatched Y-junction, i.e., one with a step feature at the transition between the taper region and the output waveguides.

The insertion loss ranges from less than 0.1 dB to less than ~0.15 dB for notch widths ranging from 60 to 100 nm, significantly less than a standard junction. FIG. 6 shows that not only does the insertion loss decrease with the mismatched or step feature design, but the sensitivity to the notch size is also diminished. The slope of the loss versus notch size is about 2-3 times smaller for the Y-junction design with mismatched taper than for the standard one.

Referring to FIG. 6B, there is shown a box plot of Y-junction insertion loss The Y-junction loss was measured for standard and mismatched (step feature) Y-junctions across a few CMOS wafers. As seen in the plot, the mismatched taper design exhibits mean loss and loss variability reduced by about a factor of two.

It should be noted that the Y-junction splitter can also be used as an optical power combiner when used in reverse. When used in reverse, the same improvement in insertion loss is obtained, due to reciprocity. Furthermore, the concept of the Y-junction with mismatched taper width can be generalized to an optical power splitter with more than two output waveguides. The output waveguides in the Y-junction with mismatched taper and in the generalized 1×N optical power splitter can have different widths to target specific splitting ratios.

In an example embodiment, a method and system are disclosed for a low-loss optical Y-junction power splitter. In this regard, aspects of the disclosure may comprise a semiconductor die with an optical Y-junction, the optical Y-junction comprising: an input waveguide, two or more output waveguides, a taper region and a step feature. The input waveguide and the taper region may include a smooth transition between the input waveguide and the taper region, and the step feature may be between the taper region and the two or more output waveguides.

The semiconductor die may comprise a silicon CMOS photonically-enabled integrated circuit. The optical Y-junction may be operable to receive an optical signal in the input waveguide and to communicate substantially equal power optical signals to each of the two or more output waveguides. The optical Y-junction may be operable to receive an optical signal in each of the two or more output waveguides and to communicate a summed output signal to the input waveguide.

The step feature may extend in a direction perpendicular to an axis of the two or more output waveguides. Widths of the two or more output waveguides may be equal. Widths of the output waveguides may be different and define a splitting ratio of the Y-junction.

In another example scenario, a system for communication may comprise a semiconductor die with an optical Y-junction, the optical Y-junction comprising: an input waveguide, two output waveguides, a notch between the output waveguides, a taper region and a step feature. The input waveguide and the taper region may include a smooth transition between the input waveguide and the taper region, and the step feature may be between the taper region and the two or more output waveguides.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
    in a semiconductor die having an optical source assembly comprising a semiconductor laser bonded to a top surface of the semiconductor die above a grating coupler, and first, second, and third optical Y-junctions, the optical Y-junctions each comprising an input waveguide, two output waveguides of continuous widths, a taper region and a step feature, the input waveguide and the taper region including a smooth transition between the input waveguide and the taper region and the step feature being between the taper region and the two or more output waveguides, wherein said continuous widths of the two output waveguides define a splitting ratio of the Y-junctions:
  communicating a continuous wave (CW) optical signal from the optical source assembly to the grating coupler;
  receiving the optical signal in the input waveguide of the first Y-junction from the grating coupler;
  communicating optical signals to each of the two output waveguides of the first Y-junction with optical powers defined by the splitting ratio;
  communicating the optical signals from the output waveguides of the first Y-junction to input waveguides of the second and third Y-junctions;
  communicating four optical signals from the second and third Y-junctions to four optical modulators in said semiconductor die; and
  modulating said four optical signals using said optical modulators based on electrical signals coupled to said optical modulators.

2. The method according to claim 1, wherein the semiconductor die comprises a photonically-enabled integrated circuit.

3. The method according to claim 1, wherein the semiconductor die comprises silicon.

4. The method according to claim 1, wherein the semiconductor die comprises a complementary-metal oxide semiconductor (CMOS) photonics die.

5. The method according to claim 1, wherein the step feature extends in a direction perpendicular to an axis of the two output waveguides.

6. The method according to claim 1, wherein a fourth optical Y-junction is part of a Mach-Zehnder interferometer.

7. The method according to claim 1, wherein an insertion loss of the first, second, and third Y-junctions is less than 0.2 dB.

8. A system for communication, the system comprising:
  a semiconductor die having an optical source assembly comprising a semiconductor laser bonded to a top surface of the semiconductor die above a grating coupler, and first, second, and third optical Y-junctions, each of the optical Y-junctions comprising:
    an input waveguide;
    two output waveguides of continuous widths;
    a taper region, the input waveguide and the taper region including a smooth transition between the input waveguide and the taper region; and
    a step feature between the taper region and the two output waveguides, wherein said continuous widths of the two output waveguides define a splitting ratio of the Y-junctions,
  the semiconductor die being operable to:
    receive a continuous wave (CW) optical signal from the optical source assembly via the grating coupler;
    receive the optical signal in the input waveguide from the grating coupler;
    communicate optical signals to each of the two output waveguides of the first Y-junction with optical powers defined by the splitting ratio;
    communicate the optical signals from the output waveguides of the first Y-junction to input waveguides of the second and third Y-junctions;
    communicate four optical signals from the second and third Y-junctions to four optical modulators in said semiconductor die; and
    modulate said four optical signals using said optical modulators based on electrical signals coupled to said optical modulators.

9. The system according to claim 8, wherein the semiconductor die comprises a photonically-enabled integrated circuit.

10. The system according to claim 8, wherein the semiconductor die comprises silicon.

11. The system according to claim 8, wherein the optical Y-junctions are operable to receive an optical signal in the input waveguide and communicate substantially equal power optical signals to each of the two output waveguides.

12. The system according to claim 8, wherein the semiconductor die comprises a complementary-metal oxide semiconductor (CMOS) photonics die.

13. The system according to claim 8, wherein the step feature extends in a direction perpendicular to an axis of the two output waveguides.

14. A system for communication, the system comprising:
  a semiconductor die having first, second, and third optical Y-junctions and an optical source assembly comprising a semiconductor laser, the optical source assembly coupled to a top surface of the semiconductor die above a grating coupler, each of the optical Y-junctions comprising:
    an input waveguide;
    two output waveguides of continuous widths;
    a notch between the output waveguides;
    a taper region, the input waveguide and the taper region including a smooth transition between the input waveguide and the taper region; and
    a step feature between the taper region and the two output waveguides, wherein said continuous widths of the two output waveguides define a splitting ratio of the Y-junctions,
  the semiconductor die being operable to:
    receive continuous wave (CW) optical signal from the optical source assembly via the grating coupler;
    receive the optical signal in the input waveguide of the first Y-junction from the grating coupler;
    communicate optical signals to each of the two output waveguides of the first Y-junction with optical powers defined by the splitting ratio;
    communicate the optical signals from the output waveguides of the first Y-junction to input waveguides of the second and third Y-junctions;
    communicate four optical signals from the second and third Y-junctions to four optical modulators in said semiconductor die; and
    modulate said four optical signals using said optical modulators based on electrical signals coupled to said optical modulators.

* * * * *